(12) United States Patent
Pires et al.

(10) Patent No.: US 12,429,987 B2
(45) Date of Patent: Sep. 30, 2025

(54) PRINTED TOUCHPAD

(71) Applicant: CONTINENTAL-INDÚSTRIA TÊXTIL DO AVE, S.A., Lousado (PT)

(72) Inventors: Carla Pires, Vimieiro (PT); Raul Falcão, Vila Nova de Famalicão (PT); Kevin Rodrigues, Vila Nova de Famalicão (PT); Isaque Sá, Vila Nova de Famalicão (PT); Roberto Laranjeira, Vila Nova de Famalicão (PT)

(73) Assignee: ContiTech Deutschland GmbH, Hannover (DE)

( * ) Notice: Subject to any disclaimer, the term of this patent is extended or adjusted under 35 U.S.C. 154(b) by 0 days.

(21) Appl. No.: 18/279,674

(22) PCT Filed: Mar. 16, 2022

(86) PCT No.: PCT/IB2022/052401
§ 371 (c)(1),
(2) Date: Sep. 1, 2023

(87) PCT Pub. No.: WO2022/200935
PCT Pub. Date: Sep. 29, 2022

(65) Prior Publication Data
US 2024/0152240 A1    May 9, 2024

(30) Foreign Application Priority Data
Mar. 23, 2021    (PT) .................................... 117134

(51) Int. Cl.
*G06F 3/044*    (2006.01)

(52) U.S. Cl.
CPC .......... *G06F 3/0445* (2019.05); *G06F 3/0446* (2019.05); *G06F 2203/04102* (2013.01);
(Continued)

(58) Field of Classification Search
CPC ..................................................... G06F 3/0445
See application file for complete search history.

(56) References Cited

U.S. PATENT DOCUMENTS

| 2015/0021153 A1 | 1/2015 | Stone |
| 2017/0010707 A1 | 1/2017 | Son |
| 2017/0308224 A1 | 10/2017 | Fan et al. |

FOREIGN PATENT DOCUMENTS

JP    6787670 B2    11/2020

OTHER PUBLICATIONS

Machine translation of JP 6787670 B2 (Published Nov. 25, 2020) (Year: 2024).*

(Continued)

*Primary Examiner* — Gustavo Polo
(74) *Attorney, Agent, or Firm* — Gregory Adams; Richard A. Wolf

(57) ABSTRACT

A screen-printed laminated multilayer capacitive touchpad seamlessly integrated into an artificial leather substrate, allowing multi-touch interaction to the user. The printed touchpad is meant to provide touch, multi-touch and gestures recognition over artificial leather articles, enabling the possibility of integration in automotive interior applications. The touchpad device has an artificial leather articles with a fully physically integrated printed touchpad on its structure resorting to the use of an insulation membrane that also ensures the protection of the device, contributing to its durability.

6 Claims, 2 Drawing Sheets

(52) U.S. Cl.
CPC .............. *G06F 2203/04103* (2013.01); *G06F 2203/04111* (2013.01)

(56) References Cited

OTHER PUBLICATIONS

International Search Report and Written Opinion for Corresponding International Application No. PCT/IB2022/052401, 9 pages, Jun. 27, 2022.
EP Examination Report dated Nov. 13, 2024 of counterpart European Application No. 22 721 844.3.

\* cited by examiner

PRINTED TOUCHPAD

CROSS-REFERENCE TO RELATED APPLICATIONS

This application is a 371 of PCT/IB2022/052401, filed Mar. 16, 2022, which claimed the priority of Portuguese Application No. 117134, filed Mar. 23, 2021, the contents of each of which are incorporated herein by reference.

TECHNICAL FIELD

The present application describes a screen-printed laminated multilayer capacitive touchpad seamlessly integrated into a leather substrate.

BACKGROUND ART

Presently, most of the known state of the art technology on the sensor field is related with the development of touchpad sensors by printing technologies for a wide range of applications such as moving cursors on display screens. However, the application of moving cursors outside the context of the application of a digital screen is not yet known.

Until present date, the process of moving a cursor on an analog or digital screen, mostly relied on the use of external devices (external or integrated mouse), or the use of the display device's own screen. The use of further base structures to perform the above-mentioned actions is not yet know from present state-of-the-art technologies.

Present invention aims to fulfil this development flaw, allowing to achieve the seamless physical integration of touchpads over flexible textile products, with particular relevance on leather applications, and with particularly low weight and thickness.

SUMMARY

Present invention discloses a touchpad device for an automotive interior surface characterized by comprising an artificial leather article with a front and back surface; a printed touchpad; and an insulation membrane; wherein the printed touchpad is physically integrated in the back surface of the artificial leather article, and the insulation membrane is located over the printed touchpad to ensure the integration in the artificial leather article and protect the printed touchpad.

In one of the proposed embodiments of present invention, the the printed touchpad comprises a printed electrode set; and a flexible polymeric substrate acting as a dielectric layer.

In another embodiment of the invention, the printed electrode set comprises top printed electrodes, and bottom printed electrodes.

Yet in another embodiment, the flexible polymeric substrate is arranged in between the top printed electrodes and the bottom printed electrodes, acting as a dielectric layer.

Yet in another embodiment, the top printed electrodes and bottom printed electrodes comprise a conductive silver ink with a sheet resistance range between 10 mΩ/sq/mil and 20 mΩ/sq/mil.

Yet in another embodiment, the top printed electrodes and bottom printed electrodes are independently printed over polymeric screen meshes.

Yet in another embodiment, the flexible substrate comprises a polymeric substrate with an approximate thickness of 50 μm, that also acts as the dielectric layer.

Yet in another embodiment, the insulation membrane comprises a polymeric substrate with an approximate thickness below 50 μm.

Present invention also discloses a method for integration of a printed touchpad on an artificial leather article characterized by comprising the steps of: printing a touchpad; lay out in a sandwich arrangement, from top to bottom, an artificial leather article, the printed touchpad and an insulation membrane; submit the sandwich arrangement simultaneously to a pressure range between 3 to 4 bars and to a temperature range between 130° C. to 160° C. for a time period of at least 30 seconds.

In one of the proposed embodiments of present method the printing of the touchpad comprises the steps of: screen-printing a top electrode in a horizontal displacement over a flexible polymeric substrate; thermally curing the first obtained printed substrate in a thermal oven at approximated temperature of 110° C. for approximately 15 minutes; screen-printing a bottom electrode in a vertical displacement on the opposite side of the flexible polymeric substrate; thermally curing the second printed layer in a thermal oven at approximated temperature of 110° C. for approximately 15 minutes.

General Description

The present application describes the development of textile structures with the integration of interactive surface devices, touchpad and feedback technologies.

The main focus of present disclosure is related with the development and production of printed electronic devices on textile structures that will generate smart functionalities (touchpad, luminescent, haptic and audio feedback). This accomplishment is achieved through the combination of printed electronics and traditional lamination processes to assure both flexibility and adaptability of the device to leather based products, allowing the upscaling of similar devices via roll-to-roll printing processes.

One of the major advantages of the present technological development lies in the fact that it allows the application of touchpad devices in artificial leather articles for the detection of touch, of multi-touch and gestures. The production technique herein disclosed and used in the development of these touchpad sensors, allows to improve and reduce the overall weight and thickness, and allow a higher integration level in an artificial leather substrate.

Thus, and in one of the preferred forms of application, the final achieved solution will be related to a capacitive printed touchpad, with high flexibility, perfectly capable of being physically fully integrated in an artificial leather backing, resulting in smart leather article (for example to automotive interior application) and capable of interacting with the user through touch and gestures. Within this field of application, leather articles and appliances with touch and/or multi-touch/gesture recognition for example in automotive interior can be considered and included for example in passenger seats, control consoles, arm rests, etc.

BRIEF DESCRIPTION OF THE DRAWINGS

For better understanding of the present application, figures representing preferred embodiments are herein attached which, however, are not intended to limit the technique disclosed herein.

FIG. 1—illustrates the proposed touchpad device (100) integrated in the end substrate. The reference numbers are related to:

1—Artificial Leather article;
2—Printed touchpad;

3—Insulating membrane;
4—Printed electrode set.

Figure 2:
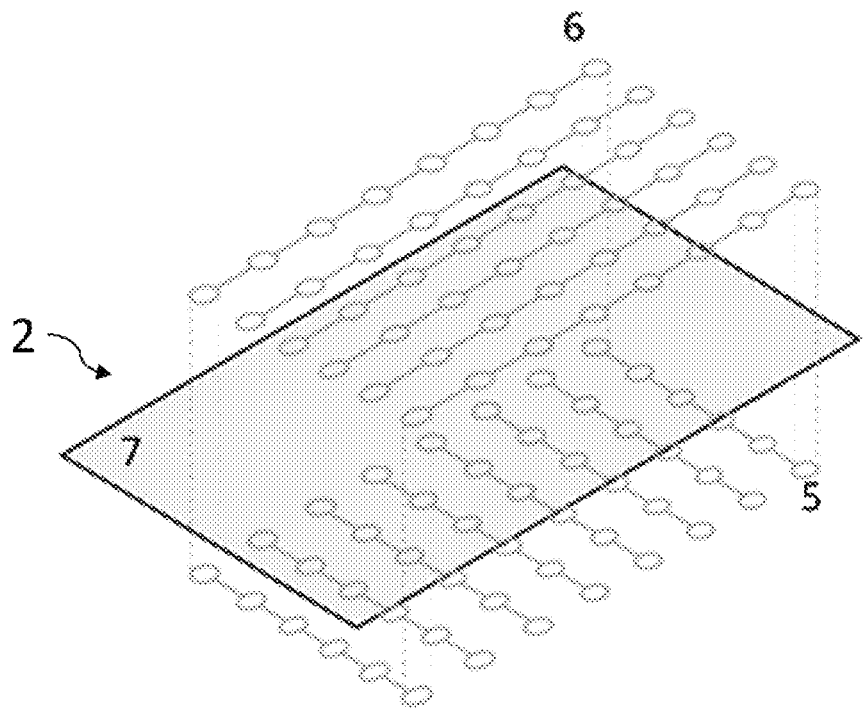

FIG. 2—illustrates the construction of the printed touchpad (2). The reference numbers are related to:

5—Bottom printed electrode layer;
6—Top printed electrode layer;
7—Flexible polymeric substrate.

Figure 3:
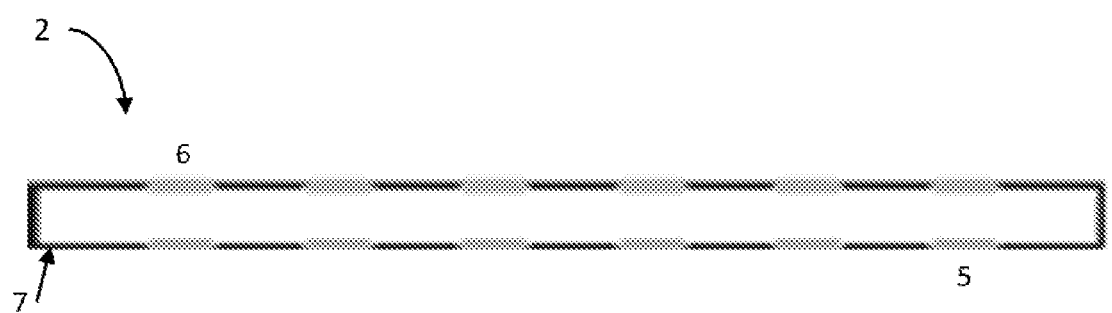

FIG. 3—illustrates a sideview/vertical cross-section of the developed printed touchpad (2). The reference numbers are related to:

5—Bottom printed electrode layer;
6—Top printed electrode layer;
7—Flexible polymeric substrate.

DESCRIPTION OF EMBODIMENTS

With reference to the figures, some embodiments are now described in more detail, which are however not intended to limit the scope of the present application.

The present application describes a touchpad device (100) comprising a fully printed capacitive touchpad (2) seamlessly integrated on is structure, which in one of the proposed embodiments, is an artificial leather article (1) or surface, while maintaining the main original features of this substrate such as mechanical flexibility and adaptability.

The printed touchpad (2) comprises a printed electrode set (4) arranged on two printed conductive layers, a top printed electrode layer (6) and a bottom printed electrode layer (5). Both electrode layers (5, 6) are printed resorting to a conductive silver ink (DuPont 5025) with a sheet resistance range between 10 mΩ/sq/mil and 20 mΩ/sq/mil. These independent layers, which require to be fully and correctly aligned, are printed through a screen-printing process over a 90×40 mesh (90 yarns/cm and 40 µm yarn diameter). This printing process is not limiting, as it can also be achieved resorting to the use of other existing techniques as inkjet, PVD or sputtering. The mesh is based on a polymeric screen that allows the passage of the silver ink in a predefined pattern. In order to obtain the complete printed touchpad (2), two separated printing processes are required, one for each deposition of the electrode layer, where each layer (5, 6) is deposited on opposite sides of the polymeric flexible substrate (7). After the layering of the ink over the polymeric substrate (7), the set is curated in a thermal oven at approximated temperature of 110° C. for approximately 15 minutes. The referred process is used both on the development of top printed electrode (5) and the bottom printed electrode (6).

The printed touchpad (2) is developed over a flexible polymeric substrate (7) which features an approximate thickness of 50 µm and is used to provide flexibility and good adhesion to the conductive inks used on the printed electrode set (4), which comprise both bottom and top layers (5, 6). The flexible polymeric substrate (7) also acts as a dielectric layer to guarantee the capacitance between the two bottom and top electrodes (5, 6).

In one of the proposed embodiments, each layer of the printed touchpad (2), i.e. bottom and top electrodes (5, 6), comprises 48 electrodes in an 8×6 display arrangement. This display arrangement fits a predetermined design pattern, but the printed touchpad (2) can be obtained with any number of electrodes and layout. Therefore, it can be executed with bigger or smaller dimensions, depending on the needs of size and/or resolution of the required printed electrode set (4). The electrodes of each layer (5, 6) are placed within a fixed distance between them, allowing a good mapping of the touch without interfering with its neighbour.

Figure 1:
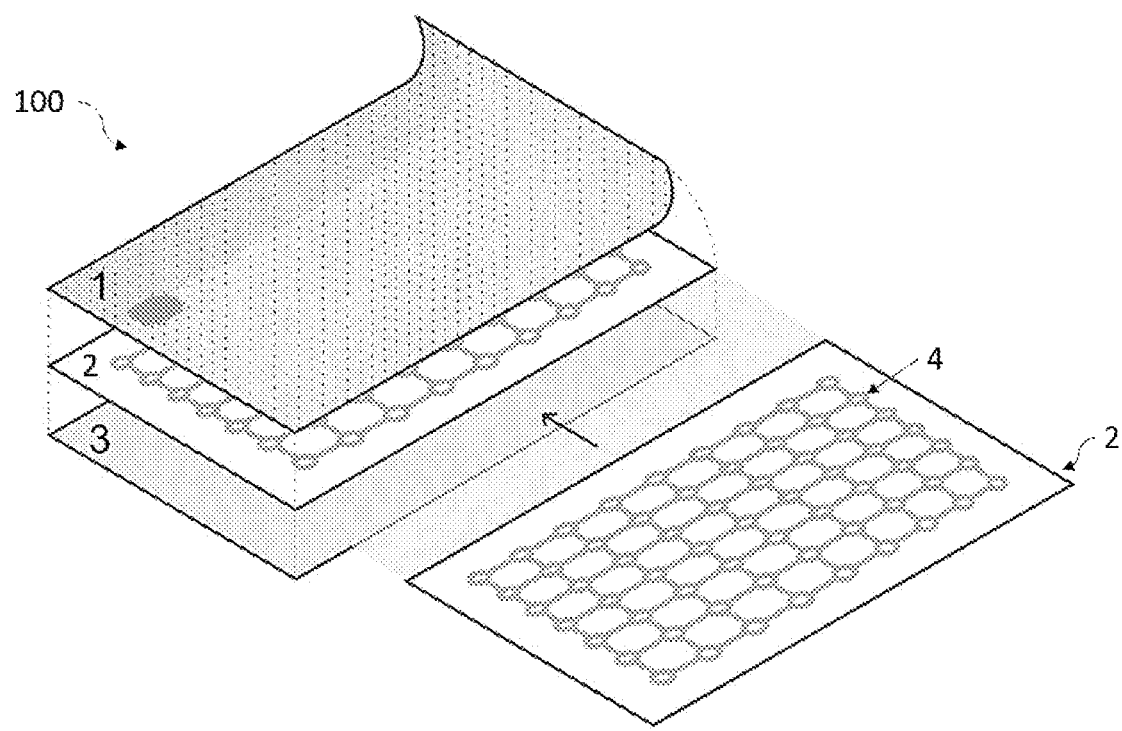

As it is possible to determine through the analysis of FIG. 1, the electrode set (4) resembles to an evenly distributed square mesh or matrix. This set (4) is achieved through the overlapping of the two upper and lower layers (4, 6). As illustrated on FIG. 2 the upper layer (6), in a possible embodiment, comprises a horizontal track layout with all the lines being arranged evenly within the same distance between them, and each horizontal line comprising a set of evenly spaced round contact points. With regard to the bottom layer (5), in a opposite and perpendicular arrangement, an in order to complete the square matrix format of the electrode set (4), it comprises a vertical track layout again with all the lines being arranged evenly with the same distance between them, and each vertical line comprising a set of evenly spaced round contact points.

In the developed printed touchpad (2), each line, and each column of the printed electrode set (4), is connected to an individual location in the controlling electronics. The interference in the capacitive field generated by the two printed layers (5, 6) activate a certain line (in one layer (6)) and a certain column (in the other layer (5)), defining the touched zone.

The printed touchpad (2) is printed on a flexible and thin substrate (7), which can be one of a Polyethylene Terephthalate (PET) or Polyethylene naphthalate (PEN) or Polyimide, to allow the final touchpad device (100) solution to ensure the original flexibility characteristics combined with a reduced thickness.

After the production of the printed touchpad (2), its integration in an artificial leather article (1) is achieved resorting to the use of a polymeric membrane (3) with a thickness below 50 µm, through a heat and pressure process (130° C. of temperature, 3 bars of pressure during for 30 seconds) to ensure the correct fixation of the printed touchpad (2) to the artificial leather article (1). Said printed touchpad (2) being placed in between the artificial leather article (1) and the polymeric membrane (3). Using this method, the polymeric membrane changes its properties and merges with the artificial leather, physically encapsulating the printed touchpad (2). The above-mentioned specific integration and merging conditions enable the correct fixation of the printed touchpad (2) to the artificial leather (1), without compromising the mechanical, electrical, and chemical properties of the developed printed touchpad (2), and particularly its original texture and flexibility. Furthermore, the materials applied in this invention were specifically chosen in terms of mechanical, electrical, thermal and chemical properties to ensure both the functionality of the solution but also the aspect of the artificial leather touchpad device (1).

With this integration method, a sensory device comprising a thickness between 100 and 150 µm is perfectly capable of being fully integrated in an artificial leather appliance (1). Below the artificial leather (1) final product, from top to bottom, a sequential arrangement of a top printed layer (6), a PET substrate (7), a bottom printed layer (5) and a polymeric membrane (3).

This integration allows a good and lasting fixation of the printed touchpad (2) to the artificial leather article (1) that can be incorporated in a car interior to act as a control panel. The used polymeric membrane (3), based on a Thermoplastic polyurethane (TPU) substrate, is used to integrate the printed touchpad (2) and also act as a covering layer that helps preserve the printed touchpad allowing the solution to last longer without losing any of the initial properties. The membrane (3) is also thin and highly flexible, keeping these properties in the final solution. The polymeric membrane used in this application achieved satisfying results in terms of artificial leather adhesion and integration, being submitted to different standard tests, namely heat shrinking, heat ageing, elongation (at 100 N), burning rate, ageing by light and Di Mattia fatigue tests. All these standard tests demonstrated that the membrane stays completely attached to the artificial leather article, fulfilling the requirements for the present application.

Another possible approach for the printed touchpad (2) integration, is the application of an adhesive solution to directly integrate the printed touchpad (2) into the artificial leather article (1). The adoption of this solution can introduce an additional rigidity to the final product guaranteeing the perfect adhesion and durability of the integrated touchpad device (100). The extra rigidity comes from the need to encapsulate the touchpad (2), ensuring the inks protection from corrosion or mechanical events, guaranteeing its durability. This extra layer of polymeric film to encapsulate the printed touchpad increases the final device thickness to a range between 150 and 200 μm.

The integration of the overall solution also implies the integration of its controlling electronics. The connections of the touchpad (2) to these electronics are ensured through the extension traces of the printed circuit, creating a printed flat cable. At the end point of this flat cable, a connector ensures the connection to the remaining controlling electronics.

With the use of capacitive sensors in the touchpad (2), the integration shall be in the backing of the artificial leather (1), keeping all the visual and texture properties of this front material.

The final solution after integration, i.e., the touchpad device (100), will result in a fully printed and highly flexible touchpad physically integrated in an artificial leather appliance. The flexibility and durability allow this invention to be applied in multiple scenarios since its versatility allows it to be used in really different purposes.

In one of the proposed and developed solutions, the printed touchpad (2) comprises printed electrode set (4) based on a matrix with 48 different detection points that can perform individual detection. This allows it to be used as a slider, in single or multiple directions, as a zone detector, or as a traditional mousepad. The printed touchpad (2) can be connected to a vehicle system and used to control different aspects of this environment or functionality. Furthermore, the fact that the device developed is compatible with hot-press processes enables a fast and effective integration in artificial leather/textiles' backing.

The invention claimed is:

1. A touchpad device for an automotive interior surface comprising:
   an artificial leather article with a front and back surface;
   a printed touchpad physically integrated in the back surface of the artificial leather article (1); and
   an insulation membrane located over the printed touchpad to ensure integration in the artificial leather article and protect the printed touchpad;
   wherein the printed touchpad comprises a flexible polymeric substrate acting as a dielectric layer and a printed electrode set comprising top printed electrodes, and bottom printed electrodes;
   wherein the flexible polymeric substrate is arranged in between the top printed electrodes and the bottom printed electrodes;
   printing the touchpad;
   laying out in a sandwich arrangement, from top to bottom, the artificial leather article, the printed touchpad and the insulation membrane;
   submitting the sandwich arrangement simultaneously to a pressure range between 3 to 4 bars and to a temperature range between 130° C. to 160° C. for a time period of at least 30 seconds.

2. The touchpad device (100) according to claim 1, wherein the top printed electrodes (6) and bottom printed electrodes (5) comprise a conductive silver ink with a sheet resistance range between 10 mΩ/sq/mil and 20 mΩ/sq/mil.

3. The touchpad device (100) according to claim 1, wherein the top printed electrodes (6) and bottom printed electrodes (5) are independently printed over polymeric screen meshes.

4. The touchpad device (100) according to claim 1, wherein the flexible substrate (7) comprises a polymeric substrate with an approximate thickness of 50 μm, that also acts as the dielectric layer.

5. The touchpad device (100) according to claim 1, wherein the insulation membrane (3) comprises a polymeric substrate with an approximate thickness below 50 μm.

6. The device according to claim 1, wherein the printing of the touchpad (2) comprises the steps of:
   screen-printing a top electrode (6) in a horizontal displacement over a flexible polymeric substrate (7);
   thermally curing the first obtained printed substrate (7) in a thermal oven at approximated temperature of 110° C. for approximately 15 minutes;
   screen-printing a bottom electrode (5) in a vertical displacement on the opposite side of the flexible polymeric substrate (7);
   thermally curing the second printed layer (5) in a thermal oven at approximated temperature of 110° C. for approximately 15 minutes.

* * * * *